3,354,073
ELECTRICAL STOCK REMOVAL APPARATUS
Alfred J. Williams, Jr., Berkley, and Douglas J. Johns, Warren, Mich., assignors to General Motors Corporation, Detroit, Mich., a corporation of Delaware
Filed Nov. 22, 1963, Ser. No. 325,674
18 Claims. (Cl. 204—224)

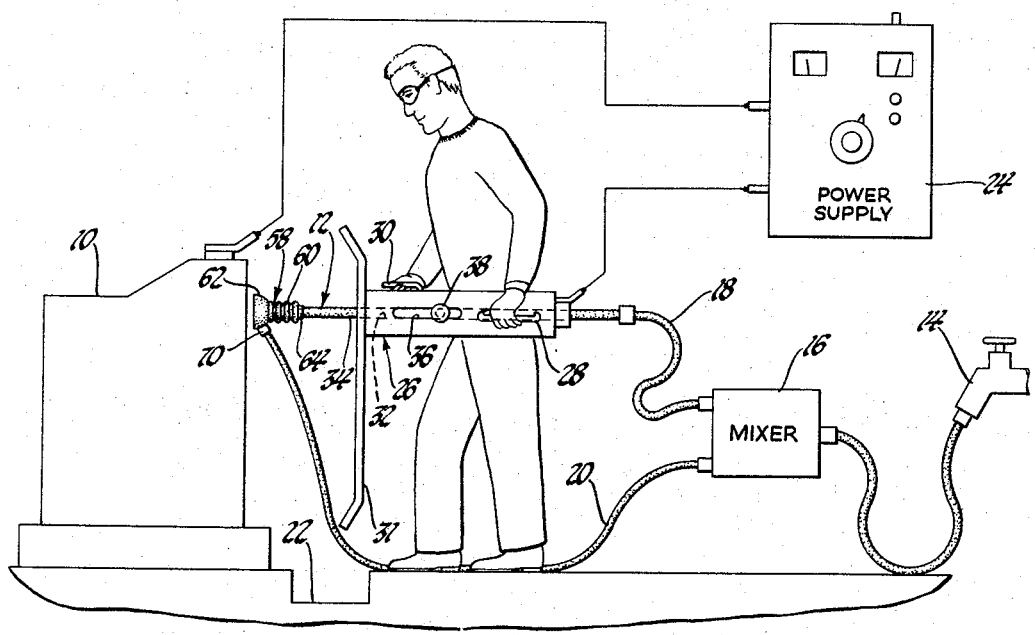
Fig. 1
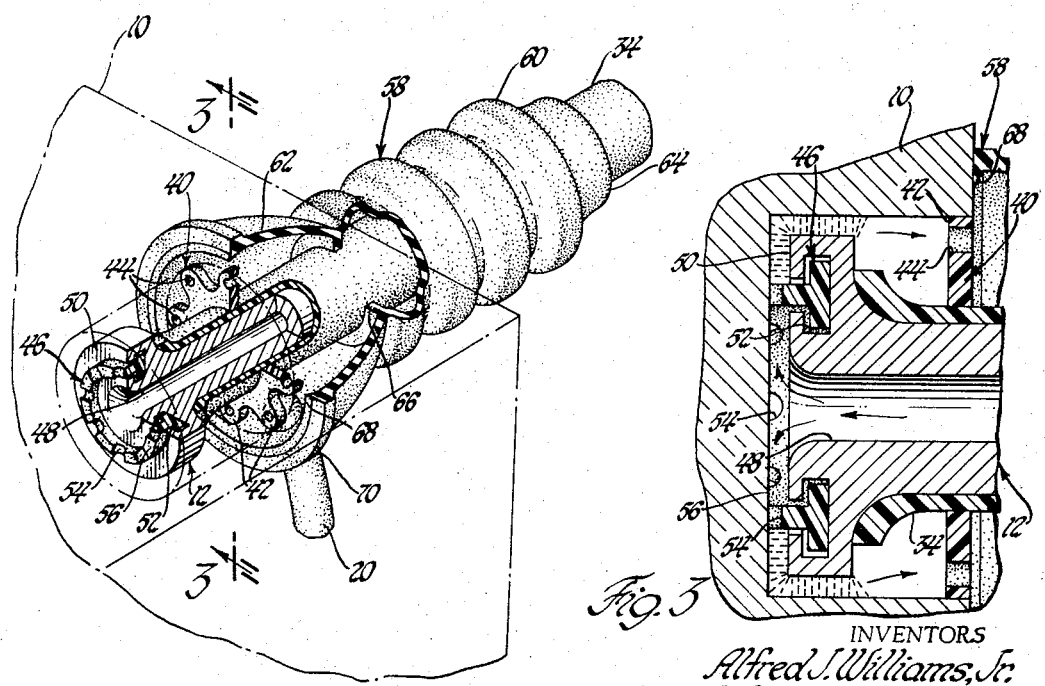
Fig. 2
Fig. 3
INVENTORS
Alfred J. Williams, Jr.
BY & Douglas J. Johns
Hugh L. Fisher
ATTORNEY

ABSTRACT OF THE DISCLOSURE

Electrical stock removal apparatus that is portable and is provided with a holder for manually feeding the cutting tool relative to the workpiece. The holder is electrically isolated from the current source and has the machining fluid transported therethrough to the work area where it is confined until discharged back through the holder. A gap spacer movably mounted on the machining surface of the cutting tool maintains the proper gap spacing and is moved by the machining fluid so that the workpiece surface in the proximity of the gap spacer is also machined. Lateral alignment during feeding is maintained by another spacer.

---

This invention relates to improvements in electrical stock removal apparatus.

With the increased use of electrical stock removal processes, such as electrochemical machining and electrical discharge machining, the need has arisen for rendering the apparatus portable. This is particularly true when the workpiece is of such a nature that it cannot easily be installed on a standard machine, or it is not practical to move the workpiece to a place where it can be machined on such standard apparatus. Making this apparatus portable presents problems since electrical power is involved and there is always a shock hazard. Also, the processes require machining fluid, e.g., electrolyte or dielectric, and these because of their inherent nature must be confined to certain areas. Then too, when manually manipulating the cutting tool, it is difficult to maintain accurate gap spacing.

With these problems in mind, novel electrical stock removal apparatus is contemplated that is particularly suited for manual transportation and for manual feeding of the cutting tool relative to the workpiece. The apparatus includes unique provisions for controlling the disposition of the machining fluid and for facilitating the proper guidance of the cutting tool during the machining operation. More particularly, the apparatus contemplated by the invention is rendered completely portable and manually operable while providing unique spacer arrangements, both for accurate gap spacing and for facilitating cutting tool feed, and a new and different machining fluid distribution system.

The foregoing and other objects and advantages of the invention will become apparent from the following description and from the accompanying drawings, in which:

FIGURE 1 is a view, partly schematic, of electrical stock removal apparatus incorporating various principles of the invention;

FIGURE 2 is a perspective view with cut-away portions of a cutting tool electrode in operation while machining a hole in a workpiece; and FIGURE 3 is a sectional view of the cutting tool electrode taken along line 3—3 of FIGURE 2.

Referring now to the drawings in detail and initially to FIGURE 1, the numerals 10 and 12 denote electrodes of a conductive material and will hereinafter be designated respectively as the workpiece and the cutting tool. A machining fluid, which if the apparatus is to be used for electrochemical machining is an electrolyte, is provided by mixing water from a conventional water tap 14 with an acid or a neutral salt solution, depending on the material of the workpiece, in a mixer 16 in any acceptable and known way. From this mixer 16 the electrolyte is transferred to the work area by a fluid distribution system that includes a feed line 18 which extends to the cutting tool 12, and a discharge line 20 which serves as a return for the contaminated electrolyte to the mixer 16. At the mixer 16 the contaminated electrolyte can be recirculated as is or filtered in any appropriate way. If preferred, the contaminated electrolyte can be discarded through a drain 22 in the floor. DC current is supplied to the work area by connecting a power supply 24 between the workpiece 10 and the cutting tool 12. As is well understood by those versed in the art, a discharge occurs with the current flowing through the electrolyte between the cutting tool 12 and the workpiece 10 and causes material to be electrochemically removed from the surface of the workpiece 10. The configuration of the working area will be determined by the shape of the cutting tool 12.

It should be kept in mind at this point that the apparatus can also be used for electrical discharge machining. The only requirements are that a dielectric fluid be substituted for the electrolyte and at a lower pressure, and the DC power supply 24 be converted to a pulse type power supply. The material then would be eroded from the workpiece 10 by a different discharge in the form of intermittent sparks. Because of the nature of these changes and because they involve conventional equipment, separate apparatus for electrical discharge machining has not been shown in the drawings.

Continuing with the more detailed explanation of the FIGURE 1 apparatus, novel provision is made for rendering the cutting tool 12 portable and easily maneuverable by an operator during the machining operation without requiring any unusual operator skills. The provision includes a holder, denoted generally at 26. This holder 26 has left and right handles 28 and 30 and a protective shield 31. A central opening 32 is furnished in the holder 26 for receiving the cutting tool 12. The cutting tool 12 is insulated from the holder 26 by an insulating jacket 34 that surrounds the cutting tool 12. Any conventional structure may be employed for clamping the cutting tool 12 to the holder 26, however, it is preferred that an adjustment slot 36 be provided in the holder 26 and an adjusting knob 38 extend through this adjusting slot 36 into physical engagement, e.g., by an insulated screw connection, with the cutting tool 12. Then, by turning the adjusting knob 38 in a tightening direction, the cutting tool 12 can be clamped to the holder 26. Thereafter, the adjusting knob 38 can be turned in a loosening direction and the cutting tool 12 then moved to whatever position is desired, determined of course by the length of the adjusting slot 36.

The novel provision for rendering the cutting tool 12 both portable and maneuverable further includes a guide arrangement that permits accurate feeding of the cutting tool 12 into the workpiece 10. This guide arrangement is best shown in FIGURES 2 and 3. As illustrated, an insulating spacer 40 with multiple fingers 42 is slidably positioned on the cutting tool jacket 34. Consequently, during the machining operation and assuming a hole is bored into the workpiece 10, the insulating spacer 40 will aid in maintaining concentric alignment of the cutting tool 12 with the bore. By having fingers 42 spaced as illustrated and also with each having through openings 44, electrolyte can freely flow past the insulating spacer 40, this being necessary as will become more apparent. Also, it will be appreciated by those versed in the art that the fingers 40 afford the necessary support without creating the large friction force that would result from using a continuous ring.

In some installations it may be preferable to have an insulating ring 40 that has flexible fingers 42. Moreover, the insulating spacer 40 will have to be shaped to conform to whatever type of bore or cavity is being formed into the workpiece 10. Hence, the insulating spacer 40 can assume many different shapes and still retain its prime function of providing lateral stability for the cutting tool 12.

Also constituting a part of the guide arrangement is a gap spacer, viewed generally at 46. In this embodiment the cutting tool 12 is formed with a tubular body 48 that is provided with a flare at 50. This flare 50 is, in turn, provided with an annular T-slot 52 that can be formed in various ways, e.g., by bending the flare 50 to the demonstrated shape, by machining, or even by making the flare 50 from plural pieces. Gap spacer 46 is also formed of insulating material, but preferably is flexible so as to be easily inserted into the T-slot 52, and of a generally smaller cross-sectional area than the T-slot 52 so as to be freely movable fore and aft and also revolvable. To facilitate electrolyte flow past the edges of the gap spacer 46 a series of grooves 54 are formed in the workpiece engaging surface 56. If wanted, these grooves 54 can be offset slightly, i.e., made nonradial to increase the rotational force from the electrolyte flow. This would be necessary whenever the frictional force between the gap spacer 46 and the bore exceeded the rotational force on the gap spacer 46 due to the electrolyte flow. Of course, this rotation of the gap spacer 46 insures that all of the workpiece surface to be machined is exposed to the electrochemical action. Also, the width of the gap spacer 46 can be selected for whatever gap spacing provides optimum machining.

The fluid distribution system, as mentioned, facilitates the portability of the apparatus and further includes a flexible sealing element, designated generally by the numeral 58. This sealing element 58 has a collapsible neck 60 that terminates at one end into a cone-shaped mouth 62. The neck 60 not only collapses to permit lengthwise adjustment of the sealing element 58, but also lightly embraces the jacket 34 in the area 64 to effect a seal therewith. A baffle 66 can be additionally provided between the mouth 62 and the neck 60 to keep any large amounts of the electrolyte from flowing into the area defined by the neck 60. The cone-shaped mouth 62 has a sealing lip 68 that flexes when the cone-shaped mouth 62 engages the face of the workpiece 10, as viewed in FIGURE 3, thus providing added insurance than an effective seal is obtained. The material of the sealing element, e.g., a good quality rubber, is selected for flexibility and the ability to handle corrosive fluid. As will be mentioned in operational summary, the electrolyte flows through the center of the tubular body 48 of the cutting tool 12 and into the working area between the cutting tool 12 and the workpiece 10, as shown by the arrows in FIGURE 3. This electrolyte after becoming contaminated in the working area flows to the right in FIGURE 3, past the insulating spacer 40, and then through the discharge conduit 20, which is attached to the flexible sealing element 58 at 70.

Operationally, the operator will first move the apparatus to the FIGURE 1 position. The supply of water from the tap 14 can be commenced and the DC power supply 24 adjusted. Now the operator will move the holder 26 and, accordingly, the cutting tool 12 until the gap spacer 46 has its surface 56 against that of the workpiece 10 and the gap spacer 46 is bottomed in the slot 52. The electrolyte will flow from the feed line 18 through the tubular body 48 of the cutting tool 12 and into the working area, as just explained, and the gap spacer 46 will start to move so that the electrochemical action will take place over the entire face of the workpiece 10 directly adjacent the flare 50, which, as demonstrated by the dash lines in FIGURE 3, serves as a machining surface. As soon as the bore is deep enough insulating spacer 40 will engage the sides of the bore, as displayed in FIGURE 3, offering the operator additional aid in laterally supporting the holder 26. The electrolyte is confined by the flexible sealing member 58 but, due to the circulation, is forced past the insulating spacer 40 and discharges via the line 20, either to be returned to the mixer 16 or allowed to flow through the floor drain 22. When the operator has machined to the depth wanted, the holder 26 is withdrawn, the DC power supply 24 disconnected, and the tap 14 turned off. The apparatus can then be transported to the next station.

From the foregoing it will be appreciated that very easily operated, portable electrical stock removal apparatus has been provided and that the problems of machining fluid distribution, gap spacing, and accurate guidance have been solved without the resort to any complex and expensive techniques. The apparatus can be adapted for either big or small installations. Moreover, the apparatus can be varied considerably without departing from the spirit of the invention. The various materials and configurations, of course, will have to be changed to meet different applications as will be appreciated by those versed in the art. Also, as has been explained, the apparatus is equally as well suited for electrical discharge machining.

The invention is to be limited only by the following claims.

What is claimed is:

1. In electrical stock removal apparatus, the combination of a conductive cutting tool adapted to have the machining surface thereon spaced from a conductive workpiece so as to form a machining gap therebetween and define a certain work area on the workpiece, means supplying machining fluid to the gap, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means adapted to afford a manually movable and insulated support for the cutting tool and guidance means for the cutting tool, the guidance means including spacing means movably positioned on the cutting tool machining surface so as to engage the work area and maintain the gap spacing of the cutting tool relative to the workpiece and insulating spacing means on the cutting tool, the insulating spacing means being constructed so as to enter the work area as stock is removed for aiding in maintaining the lateral alignment of the cutting tool relative to the workpiece.

2. In electrical stock removal apparatus, the combination of a conductive cutting tool adapted to be spaced apart from a conductive workpiece so as to form a machining gap therebetween and define a certain work area on the workpiece, means supplying machining fluid to the gap, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means affording a manually movable and insulated support for the cutting tool and guidance means for the cutting tool, the guidance means having spacing means movably positioned on the cutting tool for establishing a certain gap distance between the cutting tool and the workpiece, the spacing means being constructed and arranged so as to be movable relative to the workpiece by the machining fluid flow through the spacing means.

3. In electrical stock removal apparatus, the combination of a conductive cutting tool adapted to be spaced apart from a conductive workpiece so as to form a machining gap therebetween and define a certain work area on the workpiece, means supplying a machining fluid to the gap, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means affording a manually movable and insulated support for the cutting tool, guidance means for the cutting tool relative to the workpiece, the guidance means including a gap spacer rotatably supported on the cutting tool and having means thereon arranged in the path of flow of machining fluid so that the machining fluid imposes a rotational force on the gap spacer for rotating the gap spacer relative to the workpiece, the gap spacer being also in engagement with the workpiece so as to establish a certain machining gap spacing between the cutting tool and the workpiece.

4. In electrical stock removal apparatus, the combination of a conductive cutting tool adapted to have the machining surface thereon spaced from a conductive workpiece so as to form a machining gap therebetween and define a certain work area on the workpiece, means supplying machining fluid to the gap, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means affording a manually movable and insulated support for the cutting tool, and guidance means for the cutting tool, the guidance means having an insulating spacer carried by the cutting tool and engageable with an internal portion of the work area for limiting lateral movement of the cutting tool relative to the workpiece and a gap spacer movably arranged on the cutting tool machining surface so as to accurately maintain a predetermined machining gap between the cutting tool and the workpiece during the machining operation.

5. In electrical stock removal apparatus, the combination of a conductive cutting tool adapted to be spaced apart from a conductive workpiece so as to form a machining gap therebetween and define a certain work area on the workpiece, the cutting tool having a passageway terminating in a flared end for providing a machining surface, the flared end having an annular groove therein, means supplying machining fluid to the passageway in the cutting tool, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means adapted to afford a manually movable and insulated support for the cutting tool, and guidance means for the cutting tool, the guidance means including an insulating spacer surrounding the cutting tool so as to restrict lateral movement thereof, and a gap spacer revolvable in the annular groove in the flared end of the cutting tool for establishing a predetermined gap distance, the gap spacer having openings therein so arranged that fluid can pass therethrough into the working area and in so passing cause rotation of the spacer.

6. In electrical stock removal apparatus, the combination of a conductive cutting tool adapted to be spaced apart from a conductive workpiece so as to form a machining gap therebetween and define a certain work area on the workpiece, means supplying machining fluid, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including fluid distributing means communicating with the supplying means, the fluid distributing means including an elongated flexible sealing element having one end thereof positioned on the cutting tool in sealing engagement therewith and having at the other end a collapsible sealing portion spaced from the cutting tool and shaped so as to surround the work area and thereby confine the machining fluid to the work area during the machining operation, the flexible sealing element also having a discharge therein for carrying away the machining fluid.

7. In electrical stock removal apparatus, the combination of a conducitve cutting tool adapted to be spaced apart from a conductive workpiece so as to form a machining gap therebetween and define a certain work area on the workpiece, means supplying machining fluid, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including fluid distributing means communicating with the supplying means and including a flexible sealing element having a collapsible neck portion for surrounding the cutting tool and a cone-shaped portion provided with a sealing lip engageable with the workpiece so as to confine the machining fluid to the work area during the machining operation, the flexible sealing element also having a discharge therein for carrying away the machining fluid.

8. In electrical stock removal apparatus, the combination of a conductive cutting tool adapted to be spaced apart from a conductive workpiece so as to form a machining gap therebetween and define a certain work area on the workpiece, means supplying machining fluid, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means adapted to afford a manually movable and insulated support for the cutting tool, guidance means for maintaining a certain gap spacing between the cutting tool and the workpiece, and fluid distributing means communicating with the supplying means, the fluid distributing means including a flexible sealing element having one end thereof positioned on the cutting tool in sealing engagement therewith and having at the other end a collapsible sealing portion spaced from the cutting tool and so shaped as to surround the work area and thereby confine the machining fluid to the work area during the machining operation, the flexible sealing element also having a discharge therein for carrying away the machining fluid.

9. In electrical stock removal apparatus, the combination of a conductive cutting tool adapted to be spaced apart from a conductive workpiece so as to form a machining gap therebetween and define a certain work area on the workpiece, the cutting tool having a passageway terminating in a machining end for providing a machining surface, the machining end having a slot therein, means supplying machining fluid to the passageway in the cutting tool, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means adapted to afford a manually movable and insulated support for the cutting tool, guidance means for the cutting tool, the guidance means including a gap spacer movably positioned in the slot in the machining end of the cutting tool for establishing a predetermined gap distance, the gap spacer having slots therein so arranged that fluid can pass therethrough into the working area and in so passing cause rotation of the spacer, and fluid distributing means communicating with the supplying means, the fluid distributing means including a flexible sealing element slidable on the cutting tool, the flexible sealing element being adapted to sealingly engage the workpiece and confine the machining fluid to the work area, the flexible sealing element also including a discharge for carrying away the machining fluid.

10. In electrical stock removal apparatus, the combination of a conductive cutting tool adapted to be spaced apart from a conductive workpiece so as to form a machining gap therebetween and define a certain work area on the workpiece, the cutting tool having a passageway terminating in a flared end for providing a machining surface, the flared end having an annular groove therein, means supplying machining fluid to the passageway in the cutting tool, a source of electrical power connected to the cutting tool and adapted to be connected to the workpiece, and means facilitating both manual transportation and manual feeding of the cutting tool relative to the workpiece so as to effect an electrical stock removing discharge across the gap thereby causing stock to be removed from the work area on the workpiece, the means including holder means adapted to afford a manually movable and insulated support for the cutting tool, guidance means for the cutting tool, the guidance means including an insulating spacer surrounding the cutting tool so as to restrict lateral movement thereof and a gap spacer revolvable in the annular groove in the flared end of the cutting tool for establishing a predetermined gap distance, the gap spacer having slots therein so arranged that fluid can pass therethrough into the working area and in so passing cause rotation of the spacer, and fluid distributing means communicating with the supplying means, the fluid distributing means including a flexible sealing element having a collapsible neck for slidably positioning the element on the cutting tool and a cone-shaped portion providing a sealing lip engageable with the workpiece so as to effect a seal surrounding the work area thereby confining the machining fluid to the work area, the flexible sealing element also having a discharge for carrying away the machining fluid from the work area.

11. An electrode for use with machining fluid in electrically removing stock from a conductive workpiece comprising a body portion having a machining surface, the machining surface having therein a slot, and a gap spacer movably positioned within the slot and adapted to maintain a certain space between the electrode machining surface and the workpiece, the gap spacer being constructed and arranged so as to be moved within the slot by machining fluid flow.

12. An electrode for use in electrically removing stock from a conductive workpiece comprising a tubular body portion and a flared end machining portion, the machining portion having an annular groove therein, and a gap spacer revolvably supported within the groove for establishing a predetermined gap distance between the electrode machining portion and the workpiece.

13. An electrode for use with machining fluid in electrically removing stock from a conductive workpiece comprising a body portion having a machining surface, the machining surface having a slot therein, a gap spacer movably supported within the slot for establishing a predetermined gap distance between the electrode machining surface and the workpiece, the gap spacer being constructed and arranged to be moved within the slot by the machining fluid, and an insulating spacer surrounding the body portion of the electrode and formed of insulating material for affording a lateral guide for the electrode relative to the workpiece.

14. An electrode for use in electrically removing stock from a conductive workpiece comprising, a tubular body portion and a flared end machining portion, the flared end machining portion having an annular groove formed therein, a gap spacer revolvably supported within the groove for establishing a predetermined gap distance between the electrode machining portion and the workpiece, and an insulating spacer surrounding the tubular portion of the electrode and having workpiece engaging fingers for affording a lateral guide for the electrode relative to the workpiece.

15. An electrode for use in electrically removing stock from a conductive workpiece comprising a body portion having a machining surface, the machining surface having a gap spacer movably joined thereto for maintaining a certain space between the machining surface and the workpiece, an elongated flexible sealing element having one end thereof positioned on the electrode body portion in sealing engagement therewith and at the other end thereof a collapsible sealing portion spaced from the electrode body portion and shaped so as to engage the workpiece and maintaining a fluid-tight enclosure therewith.

16. An electrode for use in electrically removing stock from the conductive workpiece comprising a body portion having a machining surface, the machining surface having a slot formed therein, a gap spacer movably positioned within this slot and adapted to maintain a certain space between the machining surface and the workpiece, and a flexible sealing element having one end thereof positioned on the electrode body portion and in sealing engagement therewith, the flexible sealing element also having at the other end thereof a collapsible neck portion surrounding the electrode and a cone-shaped portion, the cone-shaped portion being spaced from the electrode body portion and provided with a sealing lip for engaging the workpiece and maintaining a fluid-tight enclosure therewith.

17. An electrode for use in electrically removing stock from a conductive workpiece comprising a body portion having a machining surface, the machining surface having a slot therein, a gap spacer revolvably supported within the slot for establishing a predetermined gap distance between the electrode machining surface and the workpiece, an insulating spacer carried by the body portion of the electrode and formed of insulating material for affording a lateral guide for the electrode relative to the workpiece, the body portion of the electrode having a flexible sealing element positioned thereon in sealing engagement therewith, the flexible sealing element also having at the other end thereof a collapsible neck portion surrounding the body portion of the electrode and a cone-shaped portion extending from the collapsible neck, the cone-shaped portion being spaced from the electrode body portion and provided with a sealing lip for engaging the workpiece so as to effect a fluid-tight enclosure therewith.

18. An electrode for use in electrically removing stock from a conductive workpiece comprising, a tubular body portion and a flared end machining portion, the flared end machining portion having an annular groove formed therein, a gap spacer revolvably supported within the groove for establishing a predetermined gap distance between the electrode machining portion and the workpiece, an insulating spacer surrounding the tubular portion of the electrode and formed of insulating material for affording a lateral guide for the electrode relative to the workpiece, a body portion of the electrode having a flexible sealing element carried thereon, the flexible sealing element having a collapsible neck portion surrounding the body portion of the electrode, and a cone-shaped portion extending from the collapsible neck and provided with a sealing lip for engaging the workpiece so as to effect a fluid-tight enclosure therewith.

References Cited

UNITED STATES PATENTS

| | | | |
|---|---|---|---|
| 1,953,955 | 4/1934 | Crouch | 204—224 XR |
| 2,457,510 | 12/1948 | Van Ornum | 204—224 |
| 2,848,310 | 5/1958 | Knuth-Winterfeldt et al. | 204—140.5 |
| 3,194,751 | 7/1965 | Brady | 204—224 |
| 3,214,360 | 10/1965 | Bender et al. | 204—224 |
| 3,257,300 | 6/1966 | Williams | 204—143 |

FOREIGN PATENTS 335,003  9/1930  Great Britain.

JOHN H. MACK, *Primary Examiner.*

D. R. JORDAN, *Assistant Examiner.*

UNITED STATES PATENT OFFICE

CERTIFICATE OF CORRECTION

Patent No. 3,354,073                          November 21, 1967

Alfred J. Williams, Jr., et al.

It is hereby certified that error appears in the above numbered patent requiring correction and that the said Letters Patent should read as corrected below.

Column 9, line 10, for "2,848,310" read -- 2,848,410 --.

Signed and sealed this 14th day of January 1969.

(SEAL)
Attest:

Edward M. Fletcher, Jr.                        EDWARD J. BRENNER

Attesting Officer                             Commissioner of Patents